April 25, 1967  T. MONNIN  3,315,827
FEEDING DEVICE
Filed Sept. 14, 1965  2 Sheets-Sheet 1

INVENTOR.
Théo Monnin

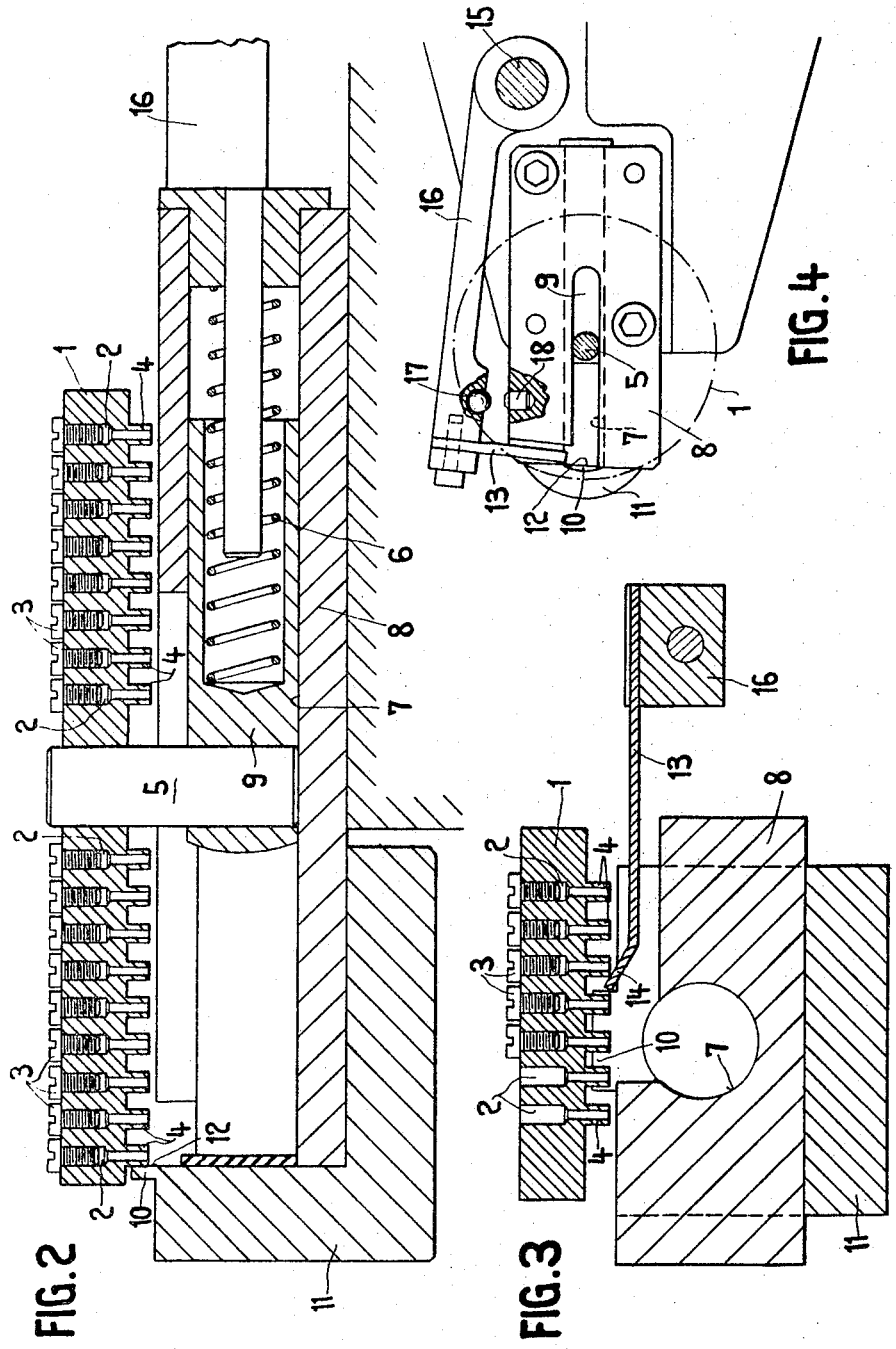

3,315,827
FEEDING DEVICE
Théo Monnin, Neuchatel, Switzerland, assignor to
Ebauches S.A., Neuchatel, Switzerland
Filed Sept. 14, 1965, Ser. No. 487,200
Claims priority, application Switzerland, Sept. 18, 1964,
12,190/64
5 Claims. (Cl. 214—300)

The known feeding devices having a channel shaped magazine for feeding mechanisms such as, for example, gripping members of machine-tools, measuring machines or other installations, have the drawback that the magazines readily become blocked or clogged or that the taking of the pieces from the magazine must be done in an unfavorable direction.

The feeding device according to the invention aims at overcoming these drawbacks. It is broadly characterized by a rotary feeding disc which is displaceable in a direction parallel to its axis, said disc having recesses arranged in a spiral, serving for orienting and positioning the pieces to be presented, and by a stop in front of which the said spiral is displaced. The feeding disc acts as a magazine.

The accompanying drawing illustrates, by way of example, one embodiment of the invention.

FIG. 2 is a cross sectional view taken along the line II—II of FIG. 1.

FIG. 3 is a cross sectional view taken along the line III—III of FIG. 1.

FIG. 4 is a plan view, at a reduced scale, of the device for rotating step by step the feeding disc.

Figure 1:
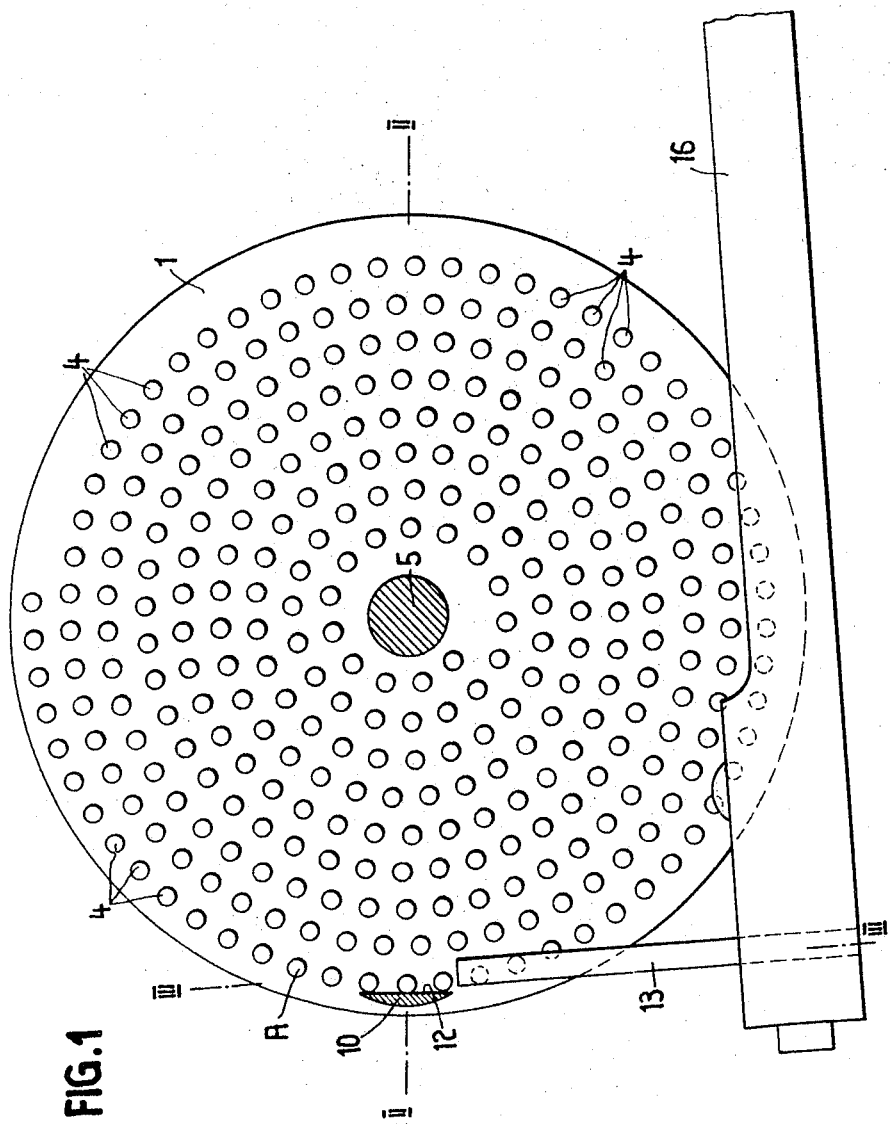
FIG. 1 is a bottom view of the feeding disc, the stop being shown in section.

The feeding disc 1 has recesses 2 arranged along an Archimedean spiral centered on its geometrical axis, the recesses 2 consisting of bores adapted to receive pieces such as screws 3, for instance for watch movements. The distance in the circumferential direction between the recesses 2 is constant along the whole spiral and nearly corresponds to the pitch of the spiral. The disc 1 has in addition necks or flanges 4 projecting on its bottom face and traversed by the bores 2. These necks 4 serve for a purpose explained below. The recesses might also consist of small tubes driven into bores of the disc 1 and projecting on the bottom face of said disc. The pivoting axle of the disc 1 consists of a shaft 5 which is mounted on a piston 9 subjected to the action of a pressure spring 6 and slidable in a bore 7 of the frame 8. The geometrical axes of the disc 1 and of the piston 9 are at right angles with each other. The disc 1 is interchangeably mounted and may be removed towards the top with the shaft 5 or else be separated from the shaft 5 rigidly connected with the piston 9. The crescent shaped stop 10 is made integral with the guide portion 11 and is situated at the level of the necks 4. In the vicinity of the stop 10 and in a direction substantially parallel to the inner face 12 of said stop 10 is arranged a flexible push-rod or pawl 13 the end 14 of which, bent upwardly, enters between two adjacent necks 4 (FIG. 3) and is adapted to turn step by step the feeding disc 1 by an angle corresponding to the peripheric distance between two adjacent recesses 2. The push-rod 13 is secured to a lever 16 which is rotatably mounted in the frame by means of a shaft 15. A ball 17 calked in the lever 16 limits the motion of the latter by striking against a pin 18 driven into the frame 8, so that the displacement of the end 14 of the push-rod 13 is also limited. This displacement is somewhat larger than the peripheric distance between the recesses 2. The lever may be actuated in any conventional manner to provide the desired step by step movement of the push rod 13. Since the means for actuation of the lever 16 does not form a part of the present invention, it will not be described here.

The device such as illustrated and described operates as follows:

If the screws 3 are small, they can be sucked up into the recesses 2 so that their heads project upwardly (FIG. 2) and have all, therefore, the same position. Moreover, the manner in which the pieces are brought into the recesses 2 does not belong to the invention. Let us suppose that the screws 3 are taken at the fixed point A (FIG. 1) at the top (FIG. 2) of the disc 1 by means of a gripper not shown or another taking device, with a predetermined cadence (e.g. every ten seconds). The loaded disc 1 is put in place while the pressure spring 6 is compressed, so that the piston 9 is in its right extreme position (FIG. 2). In the position occupied by the parts in FIG. 1, thirteen screws of the outer turn of the disc 1 have already been removed and the fourteenth screw is at A, where it is to be seized. The neck 4 of the seventeenth recess 2 is pressed by the spring 6 against the middle portion of the inner face 12 of the stop 10. The end 14 of the push-rod 13 is at a small distance of the eighteenth neck 4. When the screw which is at A has been taken, the lever 16 moves the push-rod 13 under the action of a control device, not shown, in the clockwise direction of FIG. 1 (bottom view). After a short lapse of time, the end 14 of the push-rod 13 acts onto the eighteenth neck 4 and displaces it, thus turning the disc 1 by one step, so that it takes the place now occupied by the seventeenth neck 4. The spring 6 exerts a so great pressure between the eighteenth neck and the surface 12 of the stop 10 that the friction produced is sufficient for immobilizing the disc 1, in spite of its inertia, at the end of the displacement of the push-rod 13, so that the fifteenth screw arrives exactly at the taking place A. Upon the movement just described, the disc 1 has slightly moved towards the left of FIG. 1, owing to the arrangement of the recesses 2 on an Archimedean spiral and under the action of the spring 6. At the end of the advance movement, the push-rod 13 is returned in a manner not described into its starting position illustrated in FIG. 1, sliding on the nineteenth neck 4 due to its own elasticity (FIG. 3).

The described advance is repeated after each taking of a screw at A, until the disc 1 is empty, with the exception of the last three recesses 2 of the inner turn. On these repeated advance movements, the piston 9 moves with the disc 1 towards the left in FIG. 2, until the last neck 4 of the inner turn is pressed against the surface 12 of the crescent shaped stop 10. At the end of the movement, the stop 10 is, therefore, due to the lateral displacement of the disc 1, between the two inner turns of the spiral, i.e., near the shaft 5. The relative movement of the parts is the same as if the disc 1 would not move laterally and the stop 10 would advance towards the inside between the turns of the spiral. The fixed taking place A might also be situated at another place than that indicated in FIG. 1, for instance at the place of the seventeenth recess 2 in FIG. 1, i.e., in the close vicinity of the stop 10.

It might also be possible to empty the disc 1 by beginning with the inner turn. This would have the advantage that the disc 1 might be placed in the correct position with respect to the stop 10 while the spring 6 is relaxed. In this case, the sense of rotation of the spiral would have to be reversed, or else the push-rod 13 should be designed to act from the opposite side.

When the disc 1 is empty, it is replaced by a full disc and the cycle described may again begin.

While a representative embodiment and details have been shown for the purpose of illustrating the invention, it will be apparent to those skilled in the art that various changes and modifications may be made therein without departing from the spirit or scope of the invention.

What I claim is:
1. A feeding device for presenting oriented pieces to a mechanism comprising a rotary feeding disc, means tending to move the feeding disc laterally, means on said disc defining recesses arranged in a spiral for receiving said oriented pieces, stop means opposing the action of said lateral moving means, said stop means progressively bearing against at least one of said recess defining means as the disc is rotated, and means for rotation of said disc.

2. A feeding device according to claim 1 in which the recesses are spaced apart in the circumferential direction at a distance corresponding to the pitch distance of the spiral.

3. A feeding device according to claim 1 in which a shaft is provided for the disc, and said means tending to move the feeding disc laterally is piston means engaging the shaft, the axis of the piston positioned at right angles to the axis of the shaft.

4. A feeding device according to claim 1 in which said means for rotation of said disc includes flexible push rod means cooperating with said recess defining means for the step by step rotation of said disc.

5. A feeding device according to claim 1 in which a second feeding disc is provided, said feeding disc and the second feeding disc being interchangeable.

References Cited by the Examiner
UNITED STATES PATENTS 3,090,607  5/1963  Johnson _____ 198—209 X HUGO O. SCHULZ, *Primary Examiner*.